UNITED STATES PATENT OFFICE.

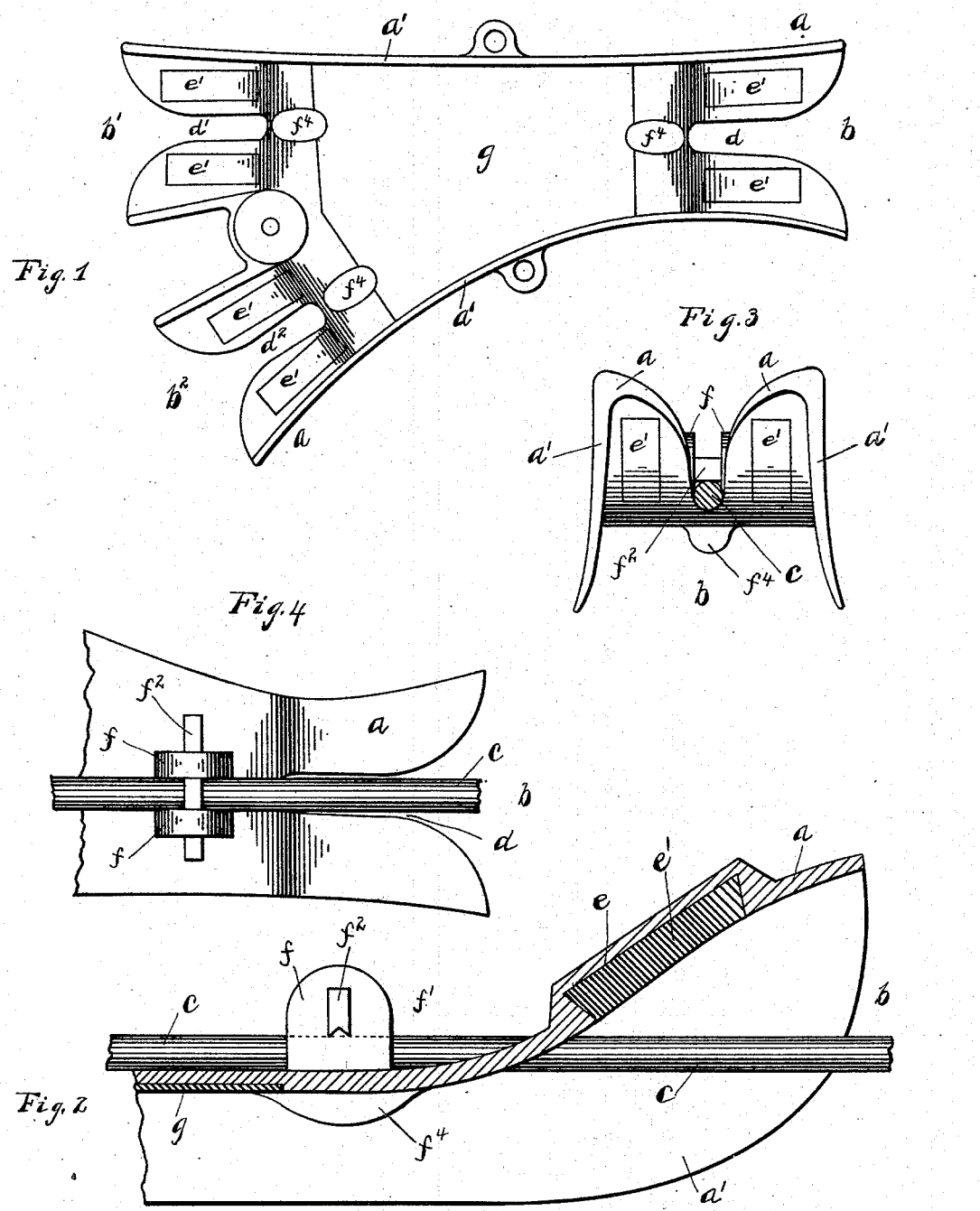

GUSTAVUS A. HUBEN, OF SPRINGFIELD, OHIO.

TROLLEY-WIRE SWITCH-PLATE.

SPECIFICATION forming part of Letters Patent No. 528,101, dated October 23, 1894.

Application filed February 23, 1894. Serial No. 501,133. (No model.)

*To all whom it may concern:*

Be it known that I, GUSTAVUS A. HUBEN, a citizen of the United States, residing at Springfield, in the county of Clark and State of Ohio, have invented certain new and useful Improvements in Trolley-Switches, of which the following is a specification.

My invention relates to improvements in trolley switches, and the object of my invention is to provide a construction for trolley switches which will enable the same to be made with a sufficient degree of strength to withstand the strain and shocks to which it is subjected, and at the same time embody that degree of lightness which is desired in such devices when employed for overhead wires.

A further object of my invention is to so construct the operative parts that the wear on the same shall be reduced to the minimum.

I attain these objects by the constructions shown in the accompanying drawings, in which—

Figure 1 is a bottom plan of a trolley switch embodying my invention. Fig. 2 is a sectional elevation of a portion of the same. Fig. 3 is a front elevation of the construction shown in Fig. 2, and Fig. 4 is a top plan of the same.

Like parts are represented by similar letters of reference in the several views.

In constructing my improved trolley switch I preferably employ a metallic frame $a\ a$, cast integral with flanges $a'\ a'$, and from any suitable metal, brass preferred. The frame is provided in the usual way with openings $b\ b'\ b^2$ into which the trolley wires from the different branches are extended in the usual manner. The main frame is curved upwardly and outwardly at the respective openings $b\ b'\ b^2$ and provided with slotted ways $d\ d'\ d^2$, through which the trolley wires $c$ are inserted. At each side of the respective ways $d\ d'\ d^2$, and on either side of the trolley wires which enter said ways, I form the curved portion of the frame with a socket $e$, the bottom of which is made larger than the top, with beveled, inclined sides, and into the socket I force a cushion $e'$ of elastic material, preferably rubber, the edges of said cushion being formed to correspond to the inclined sides of the socket, so that the elasticity of said cushion holds it firmly in place after it has been forced therein. These cushions stand in the inclined or curved wall of the trolley switch at each entrance thereto, and in line with the flanges of the trolley wheels which travel on the trolley wires, the location of the cushion being such that as the trolley wheel contacts with the switch, the first contact is made with said cushion, so that the shock occasioned by the striking of the trolley wheel against the switch is materially reduced, and the wear resulting therefrom very materially lessened.

At each side and to the rear of the respective ways $d\ d'\ d^2$, I provide projecting ears or lugs $f$, having slotted openings $f'$, extending transversely through the same, and in these slotted openings I insert a wedge-shaped key $f^2$, having a V-shaped notch or way $f^3$ in its lower side adapted to contact with the trolley wire. This key may be made of steel or other suitable metal, and, when driven firmly through the openings in the ears, clamps the trolley wire firmly between the same, and thus furnishes a simple and efficient means for securing the wires in their proper positions. The V-shaped notch in the bottom of the key or wedge produces serrations which engage firmly with the wire and thus hold it against any possible slipping.

To further provide for strengthening the parts, I construct the frame immediately below each pair of lugs with a curved or beveled boss $f^4$, which serves the double purpose of strengthening the frame under said ears and also to form a guide for the trolley wheel as it passes off from the trolley wire.

To further reduce the wear on the metallic frame, I provide in the under side of the top of the frame a plate $g$, of hard metal, preferably of steel, adapted to form the track along which the trolley runs in passing from one opening to another. This plate $g$ may be cast into the frame in the process of construction, or it may be inserted therein after the same is completed. If the latter method is employed, the lugs or bosses $f^4$ may be riveted down over the plate to hold it in position.

It will be seen from the above description that I thus produce a trolley switch which may be made extremely light and at the same time embody the proper strength, while the arrangement of the parts and distribution of the materials are such that the wear thereon is reduced to the minimum.

Having thus described my invention, I claim—

1. In a trolley switch, a metallic frame having an enlarged mouth or opening, and a trolley wire entering the same, and elastic cushions arranged on each side of said trolley wire, substantially as specified.

2. The combination with the frame having slotted openings therein, a trolley wire adapted to extend into said openings, perforated ears at each side of and behind said slotted openings, and a serrated key adapted to extend through said perforated ears and engage the trolley wire which is placed between said ears, substantially as specified.

3. A trolley switch consisting of a main frame having enlarged openings; slotted ways therein, projecting ears behind said ways having lateral perforations through the same, a serrated key adapted to pass through said ears, and a boss on the under side of said frame adjacent to said ears, substantially as and for the purpose specified.

4. The combination with a frame having enlarged mouths and having sockets formed therein, of cushions inserted into said sockets, open ways between said cushions and perforated ears adjacent to said ways, and a serrated key adapted to extend through said ears, substantially as specified.

5. In a trolley switch, a metallic frame cast integral with side flanges, and enlarged mouths or openings, and a wearing plate of hard metal forming the contacting track between the respective openings, substantially as specified.

6. A trolley switch having enlarged openings, and cushions therein, fastening ears arranged adjacent to said openings, and bosses opposite to said ears, and a metallic plate of hard metal extending from the respective bosses and held in position thereby, substantially as specified.

7. The combination with a metallic frame cast integral with side flanges, as described, perforated lugs and adjacent bosses, serrated keys to pass through said lugs, and a wearing plate of hard metal adapted to form the track between said bosses, substantially as specified.

In testimony whereof I have hereunto set my hand this 25th day of January, A. D. 1894.

GUSTAVUS A. HUBEN.

Witnesses:
OLIVER H. MILLER,
CHAS. I. WELCH.